United States Patent
Beccaria et al.

(10) Patent No.: US 9,475,956 B2
(45) Date of Patent: Oct. 25, 2016

(54) POWDER COATING COMPOSITIONS FOR LOW TEMPERATURE CURING AND HIGH FLOW

(71) Applicant: Synthomer USA LLC, Dover, DE (US)

(72) Inventors: Damiano Beccaria, Bene Vagienna (IT); Imir Bejko, Sant'Albano Stura (IT); Andrea Capra, Sant'Albano Stura (IT); Irene Panero, Sant'Albano Stura (IT); Alessandro Munari, Sant'Albano Stura (IT)

(73) Assignee: SYNTHOMER USA LLC, Dover, DE (US)

( * ) Notice: Subject to any disclaimer, the term of this patent is extended or adjusted under 35 U.S.C. 154(b) by 139 days.

(21) Appl. No.: 13/967,001

(22) Filed: Aug. 14, 2013

(65) Prior Publication Data
US 2013/0331513 A1    Dec. 12, 2013

Related U.S. Application Data

(62) Division of application No. 13/140,338, filed on Jul. 29, 2011, now abandoned.

(30) Foreign Application Priority Data

Dec. 19, 2008  (EP) ...................................... 08075956
Dec. 14, 2009  (WO) .................. PCT/EP2009/008928

(51) Int. Cl.
C09D 167/08    (2006.01)
C08G 63/48    (2006.01)
C09D 167/02    (2006.01)

(52) U.S. Cl.
CPC .............. *C09D 167/02* (2013.01); *C08G 63/48* (2013.01); *C09D 167/08* (2013.01)

(58) Field of Classification Search
CPC ... C08G 63/48; C09D 167/02; C09D 167/08
USPC ....................................................... 528/295.5
See application file for complete search history.

(56) References Cited

U.S. PATENT DOCUMENTS

| | | |
|---|---|---|
| 4,001,153 A | 1/1977 | Ogino et al. |
| 4,211,691 A | 7/1980 | Fitzgerald |
| 4,379,895 A | 4/1983 | Frerking, Jr. et al. |
| 6,063,464 A | 5/2000 | Charbonneau et al. |
| 6,342,300 B1 | 1/2002 | Bengs et al. |
| 6,720,079 B2 | 4/2004 | Moens et al. |
| 7,887,982 B2 | 2/2011 | Vijayendran et al. |
| 8,106,148 B2 | 1/2012 | Vijayendran et al. |
| 2003/0055142 A1 | 3/2003 | Steckel |
| 2004/0211678 A1 | 10/2004 | Edmondson |
| 2008/0145775 A1 | 6/2008 | Vijayendran et al. |
| 2009/0105377 A1 | 4/2009 | Vijayendran et al. |
| 2012/0136116 A1 | 5/2012 | Vijayendran et al. |

FOREIGN PATENT DOCUMENTS

| | | |
|---|---|---|
| CN | 1613935 | 5/2005 |
| EP | 0322834 A2 | 7/1989 |
| EP | 1873183 A1 | 1/2008 |
| WO | WO 91/14745 | 10/1991 |
| WO | WO 94/11451 | 5/1994 |
| WO | WO 2006/102279 A2 | 9/2006 |
| WO | WO2006/102280 | 9/2006 |
| WO | WO 2007/025664 A2 | 3/2007 |
| WO | WO 2008/000470 A2 | 1/2008 |
| WO | WO 2008/000471 A2 | 1/2008 |

OTHER PUBLICATIONS

J.Argyropoulos et al. "Unoxol Diol", Paint and Coatings, Jun. 2006.
Richart "Coatings Methods, Powder Technology", published Oct. 22, 2001, Astract and Article.

*Primary Examiner* — Ling Choi
*Assistant Examiner* — Gennadiy Mesh
(74) *Attorney, Agent, or Firm* — Knobbe Martens Olson & Bear LLP

(57) ABSTRACT

The present invention discloses powder coating compositions and to components and ingredients for incorporation therein, suitable for low temperature curing schedule and with excellent resistance to outside aging. The powder coating composition can be cured at a temperature from 140° C. to lead to a coating with excellent flow and high gloss. In one aspect of the invention, a composition having a polyester resin comprises 0.1 to 60 weight percent of mono or poly-functional satured or unsatured fatty acids of mixtures of them, 30 to 60 weight percent of an aromatic diacid or cycloalkyl diacids or anhydride 20 to 30 weight percent of aliphatic diol, 0 to 6 weight percent of aliphatic triol, 0 to 10 weight percent of isosorbide and isomers or cycloalkyl diol, 0 to 10 weight percent of $C_3$-$C_{12}$ aliphatic diacid, and with total weight percent of the monomers equal to 100.

8 Claims, No Drawings ns and to components and ingredients for incorporation
POWDER COATING COMPOSITIONS FOR LOW TEMPERATURE CURING AND HIGH FLOW This application is a divisional application of co-pending U.S. patent application Ser. No. 13/140,338, filed on Jul. 29, 2011, which application claims the benefit of PCT Application PCT/EP2009/008928 with International Filing Date of Dec. 14, 2009, published as WO 2010/069531 A1, which further claims priority to European Patent Application No. 08075956.6 filed Dec. 19, 2008, the entire contents of each application are hereby incorporated by reference.

The present invention relates to powder coating compositions and to components and ingredients for incorporation therein, suitable for low temperature curing schedule, with excellent flow of the coating, good flexibility, no blooming phenomenon and resistance to outside aging.

Powder coating technology is generally a well-known and well defined art and has significant advantages over "wet" technologies for painting and spraying. The principle behind thermoset powder coating decoration is that the powder coating is formulated by dispersing coloring agents or pigments within a matrix of cross-linkable material, grinding the material to a powder, applying the powder to a surface to be coated and then heating or baking to cause the powder particles to coalesce to form a layer on the surface to be decorated and thereafter causing or allowing curing or crosslinking to take place to form a thermoset layer. Based on these principles the skilled artisan is always searching the best compromise between cure/production cost and appearance of the thermoset coating. Recently, the industry has showed an interest in lower curing temperature for environmental and economical reasons.

A major challenge in the development of powder coatings, for this purpose, is the need to satisfy a number of seemingly conflicting requirements. One of the essential requirements of a powder coating is that it should be curable/cross-linkable. In the majority of cases this means the incorporation of a cross-linking agent and the increase of the melt viscosity over the bake period. It is desirable that the baking should be as efficient as possible to minimize energy costs. The flow of the coating is determined by the viscosity build-up of the thermosetting composition during the curing, if the increase of viscosity occurs at a too early stage in the baking process, it will have as result that the powder particles will not have fully coalesced and "leveled". This will result in the production of an article with an unacceptable finish, usually characterized by "orange peel".

A thermosetting powder coating with outstanding properties for exterior end applications is typically based on a polyester resin. Polyester powder coatings are typically formulated with polyepoxide or beta hydroxyalkyl amide type cross-linking compounds. The technology surrounding these materials is generally well known and has been discussed and considered in a number of articles and prior patent specifications.

Attempts have thus been made to design polyester resins bearing carboxyl groups with a reduced initial melt viscosity and/or the reactivity of the thermoset composition or by the use of additives.

Patent EP 0 322 834, for example, describes thermosetting powder compositions essentially containing a polyester bearing carboxyl groups and a beta-hydroxyalkylamide, which is applied to a substrate and is then crosslinked at a temperature of 160 to 200° C. Despite the presence of benzoin as additive in these compositions, which is added as degassing agent, the bubbles of water and air remain trapped in the hardened coating after it has melted and crosslinked, especially if the coating is relatively thick. In addition, the flow of the powder when it melts is not optimal.

Patent application WO 91/14745 describes thermosetting powder compositions containing an amorphous polyester containing carboxyl groups, a semi-crystalline polyester containing carboxyl groups and a crosslinking agent. 10 to 40% by weight of the semi-crystalline polyester is preferably used relative to the polyesters as a whole, and the crosslinking agent can be a beta-hydroxyalkylamide. The presence of the semi-crystalline polyester in these compositions improves the mechanical properties of the coatings they provide. However, the presence of these semi-crystalline polyesters also increases the rate of hardening of these compositions, which could be a factor which disfavors the satisfactory flowing and degassing of these compositions when they melt, leading to surface defects in the coatings.

Patent application EP 0 668 895 also describes thermosetting powder compositions containing a polyester bearing carboxyl groups and a beta-hydroxyalkylamide. The polyesters of that patent application have a functionality of carboxyl groups of less than 2, obtained by adding monofunctional acids or alcohols during the synthesis of the polyester. By virtue of this reduced functionality, the polyester is less reactive, which makes the powder flow better when it melts and allows the bubbles of air and of water vapor to escape from the coating before it hardens, unlike the compositions in patent applications EP 0 322 834 and WO 91/14745. However, since the polyester contains chain ends which do not bear a reactive group, these ends do not participate in the formation of the three-dimensional network during the crosslinking of the powder, thus reducing the resistance to solvents and the flexibility of the coatings thus obtained.

The EP 1 054 917 claims to solve the above drawbacks of using a beta-hydroxyalkylamide as crosslinker by incorporation of tertiary carboxyl groups as reactive groups in the polyester resins. The said compositions provide coatings with excellent surface appearance, good flexibility and good resistance to poor weather conditions due to the lower reactivity and which induces a longer cure schedule.

As can be appreciated, it is not easy to find a thermosetting powder composition which by itself combines all the qualities which it would be desired to find therein, such as good stability in storage, good flowing when melting in order to give it a smooth, and glossy appearance which has no orange-peel skin or bubbles, good flexibility, at the same time as good resistance to solvents, to aggressive weather exposure and all of this at a low temperature curing.

The present invention seeks to provide powder coating compositions exhibiting low temperature curing but which fulfill the quality requirement of coating such as flow, flexibility and HSE legislations.

We have found, surprisingly, that low temperature cure and good flow could be achieved, provided that the polyester resin composition comprises:
(1) Polyols,
(2) Diacids,
(3) Fatty acids.

According to one aspect of the present invention there is provided a polymeric composition suitable for use as a vehicle for a powder coating composition which comprises: a composition in that the acid/alcohol mole ratio is higher than 1 and with an acid value of higher than 15 mg KOH/g.

According to another aspect of the present invention there is provided a polymeric composition suitable for use as a vehicle for a powder coating composition which comprises:

a composition of in that the acid/alcohol mole ratio is lower that 1 and with a hydroxyl value of higher than 25 mg KOH/g.

A preferable composition in that polyester resin comprises:

(1) 0.1 to 60 weight percent of mono or poly-functional satured or unsatured fatty acids of mixtures of them, (2) 30 to 60 weight percent of an aromatic diacid or cycloalkyl diacids or anhydride, (3) 20 to 30 weight percent of aliphatic diol, (4) 0 to 6 weight percent of aliphatic triol, (5) 0 to 10 weight percent of isosorbide and isomers or cycloalkyl diol, (6) 0 to 10 weight percent of $C_3$-$C_{12}$ aliphatic diacid, and with total weight percent of the monomers equal to 100.

A more preferred composition in that polyester resin comprises (1) 0.5 to 30 weight percent of mono or poly-functional satured or unsatured fatty acids of mixtures of them, (2) 30 to 60 weight percent of an aromatic diacid or cycloalkyl diacid or anhydride, (3) 20 to 30 weight percent of aliphatic diol, (4) 0 to 6 weight percent of aliphatic triol, (5) 0 to 10 weight percent of isosorbide and isomers or cycloalkyl diol, (6) 0 to 10 weight percent of $C_3$-$C_{12}$ aliphatic diacid, and with total weight percent of the monomers equal to 100.

The above composition with the aromatic diacid, cycloalkyl diacid or anhydride selected from the group consisting of isophthalic acid (IPA), terephthalic acid (TPA), phthalic anhydride (PA), trimellitic anhydride (TMA), furandicarboxylic acid (FDCA), cyclohexandicarboxilic acid (CHDA), hexahydrophtalic anhydride (HHPA).

The melt viscosity (ICI) at 200° C. of the polyester resin is from 1500 to 12000 mPa·s and a Tg of above 35° C. but lower than 70° C.

The powder formulation based on the above acid functional polyester resin is then combined with a curative selected from a non-isocyanurate polyepoxide or beta-hydroxyalkylamide or triglycidyl-isocyanurate or epoxy resins (glycidyl ethers of Bisphenol A & F or epoxy novolac resins, glycidyl esters and mixtures thereof) in a weight percent (on total polyester resin and curative) of 2.5 to 50.

Another aspect of the invention is that when the polyester resin has an hydroxyl functionality the curative is selected from trimer of isophorone diisocyanate, trimer of hexamethylene diisocyanate, caprolactam-blocked polyisocyanate or self blocked uretdiones in a weight percent (on total polyester resin and curative) of 8 to 65.

Slight variations above and below the stated ranges can be used to achieve substantially the same results as values within the ranges. Also, the disclosure of the ranges is intended as a continuous range including every value between the minimum and maximum values.

In the tables 1, 2, 3 and 4 below, we compared the polyester recipes and final resin physical and chemical properties for different curative systems.

In table 5 below, we listed the powder coating formulations in Primid (93/7 and 95/5 ratios) and TGIC systems.

In the tables 6, 7 and 8 the application performances of the previous powder coatings in three different curing conditions: 10' @ 180° C., 10' @ 160° C. and 30'@ 140° C. are given.

In the application tests at 10'@160° C. curing condition (table 7) we disclosed worse results for 95/5 than for 93/7 Primid system, particularly in flexibility and for TGIC system for coating appearance and toxicological labeling.

In table 8, we compared some 93/7 Primid system powder coatings in the most demanding curing condition: 30'@140° C. Comparative examples I, L, M are conventional resins and examples 1, 2, 3, 4, 5 are formulations with fatty acids to prove better low temperature cure performance results.

The polymeric vehicle of the invention is formulated to provide a coating binder with desirable hardness, flexibility, solvent resistance, corrosion resistance, weatherability and gloss. The enhancement of these properties depends on the optimization and balancing of factors including monomer composition, $T_g$ of the resin, type and amount of crosslinking agent, curing conditions, curing catalysts, and type and amount of pigments, fillers and additives. The reactivity is increased without sacrificing chemical storage stability or causing poor flow of the film.

The coatings compositions of this invention exhibit remarkable storage stability, smooth surface appearance, high gloss, and excellent mechanical properties which are maintained over time. It will be appreciated by skilled people in the powder coating industry, that an excellent balance among stability and the flow of the cured film and weather-ability and mechanical properties imparted by the use of compositions in accordance with the invention are important factors of commercial importance.

The powder coating compositions of the invention are cured at a temperature lower than 180° C. and higher than 100° C. and preferably between 160° C. and 140° C.

As used herein "coating binder" is the polymeric portion of a coating film after baking and after crosslinking.

"Polymeric vehicle" means all polymeric and resinous components including crosslinking agents in the formulated coating; i.e. before film formation. Pigments and additives may be mixed with the polymeric vehicle to provide a formulated powder coating composition.

"Diol" is a compound with two hydroxyl groups. "Polyol" is a compound with two or more hydroxyl groups.

"Diacid" is a compound with two carboxyl groups. "Polyacid" is a compound with two or more carboxyl groups.

As used in this application, "polymer" means a polymer with repeating monomeric units as defined herein.

A "film" is formed by application of the formulated coating composition to a base or substrate, and crosslinked.

Acid number or acid value means the number of milligrams of potassium hydroxide required for neutralization of free acids present in 1 g of resin. Hydroxyl number of value that is also called acetyl value is a number that indicates the extent to which a substance may be acetylated; it is the number of milligrams of potassium hydroxide required for neutralization of the acetic acid liberated on saponifying 1 g of acetylated sample.

The polyesters useful in the practice of the invention are thermosettable carboxyl terminated polymers, suitable for formulation of thermosetting powder coatings with epoxide bearing compounds or beta-hydroxyalkylamide. This implies that the polyesters have a sufficiently high glass transition temperature to resist sintering when in powder form and subjected to normally encountered field conditions. The polyester of the present invention has a glass transition temperature $T_g$ greater than or equal to 44° C., when determined by differential scanning calorimetry employing a heat-up rate of 10° C. per minute in a nitrogen atmosphere; the value is taken at the second run.

As the number average molecular weight of the carboxylated polyester and the hydroxyl value of the hydroxyl terminated polyester vary, the number of equivalents of diacid necessary to react with the hydroxyl terminated polyester also will vary. The resulting carboxyl terminated polyester has an acid value in the range of from 14 to 60, and a number average molecular weight in the range of from 2000 to 15000.

For the preparation of the thermosetting powder compositions of the invention, the polyester and the curing compound and various auxiliary substances conventionally used for the manufacture of powder paints and varnishes are mixed homogeneously. This homogenization is carried out for example by melting the polyester, the polyepoxide compound and the various auxiliary substances at a temperature within the range of from 90 to 100° C., preferably in an extruder, for example a Buss-Ko-Kneader extruder or a twin-screw extruder of the Werner-Pfleiderer or Baker Perkins type. The extrudate is then allowed to cool, and is ground and sieved to obtain a powder, having a particle size of 10 to 120 micrometers.

The auxiliary substances which can be added to the thermosetting compositions according to the invention include ultraviolet light absorbing compounds such as Tinuvin 928 (from CIBA—Specialties Chemicals), light stabilizers based on sterically hindered amines (for example Tinuvin 144 from CIBA—Specialties Chemicals), phenolic antioxidants (for example Irganox 1010 from CIBA—Specialties Chemicals) and stabilizers of the phosphonite or phosphite type (for example Irgafos 168 or P-EPQ from CIBA—Specialties Chemicals) (Tinuvin, Irganox, Irgafos are Trademarks). A variety of pigments may also be added to the thermosetting compositions according to the invention. Examples of pigments that may be employed in the invention are metal oxides such as titanium dioxide, iron oxide, zinc oxide and the like, metal hydroxides, metal powders, sulfides, sulfates, carbonates, silicates such as aluminum silicate, carbon black, talc, china clays, barytes, iron blues, lead blues, organic reds, organic maroons and the like. Auxiliary substances may also include flow control agents such as Fluidep F 630 (from COMIEL) Resiflow PV88 (from WORLEE), Modaflow (from Cytec), Acronal 4F (from BASF) (Fluidep, Resiflow, Modaflow, Acronal are trademarks) plasticizers such as dicyclohexyl phthalate, triphenyl phosphate, grinding aids, degassing agents such as benzoin and fillers. These auxiliary substances are added in conventional amounts, it being understood that if the thermosetting compositions of the inventions are used as clear coatings, opacifying auxiliary substances should be omitted.

The ground powder paint composition may be applied to the substrate by any of the known means of application. After coating, the deposited layer is cured by heating in an oven. While typically curing is effected at a temperature of 180° C. in order to obtain sufficient crosslinking to provide the required coating properties, the compositions of the invention may be cured at lower temperature, for example by maintaining a temperature 160° C. or even 140° C. The decrease of curing temperature is economically and technically advantageous since it permits to save energy costs and it offers the possibility to work with substrate that are less thermal resistant than steel.

Another advantage of the invention is that the coatings prepared from the compositions containing the polyesters according to the invention have a combination of outstanding properties. Improving the appearance of coatings applied as powders to be equivalent to the quality liquid coating finishes is an important consideration, and the present invention provides coatings with excellent appearance. While conventional coatings can be applied as relatively low viscosity liquids to give smooth films after removal of water and/or solvents, applied powder particles must melt, flow, wet the substrate, and coalesce and level to form a continuous film. The polymeric vehicle of the present invention is effective for providing a stable melt viscosity and flow.

While solvent/water based coatings can utilize polymer systems with a $T_g$ even below room temperature, the $T_g$ of a coating powder resin must be above 45° C. in order to possess acceptable non sintering characteristics. If the $T_g$ of the coating is high enough, sintering can be avoided. However, coalescing and leveling at the lowest possible temperature are promoted by reducing $T_g$. If the stability of the formulated composition is to be maintained in storage without partial curing, then the $T_g$ must be maintained at a sufficient level, i.e. greater than 44° C. The present invention optimizes $T_g$ in combination with other factors to provide good coalescence and leveling of the coating prior to cure, whilst not sacrificing storage stability of the formulated powder coating.

The following examples should be understood to be illustrative of the scope of the invention, which is defined in the appended claims.

The present invention is further defined in the following examples. It should be understood that these examples are given by way of illustration only. From the above discussion and these examples, one skilled in the art can ascertain the essential characteristics of this invention, and without departing from the spirit and scope thereof, can make various changes and modifications of the invention to adapt it to various uses and conditions. As a result, the present invention is not limited by the illustrative examples set forth herein below, but rather is defined by the claims contained herein below.

General Preparation Procedure

EXAMPLE a

Composition According to the Invention

Single-Stage Synthesis of Carboxyl and Hydroxyl Resin:

First stage 27.0 parts of D-Isosorbide are placed in a flask under nitrogen and with stirring with 11.4 parts of neopentilglycol 90%, 7.3 parts of terephthalic acid, 30.9 parts of isophtalic acid, 3.4 parts of adipic acid, 19.9 parts of satured 80/20 dimer/trimer fatty acid and 0.1 part of MBTO as catalyst and heated to 245° C. The reaction is continued at 245° C. until the distillation under atmospheric pressure stops then the content of the flask is placed under vacuum (residual pressure 50 mmHg) until the polyester obtained has the following characteristics: Acid number 34.2 mg KOH/g, ICI viscosity at 200° C. 3280 mPa·s, Tg (DSC; 10° C./min) 53° C., Mw 11348 and Gardner Holdt color as a 50 wt. % solution in N-methyl-2-pyrrolidone is 3.

Accordingly to the procedure as described for the example a, the polyesters of examples b, c, d, e, f, g and h are prepared (compositions and properties are given in Tables 1 and 2).

EXAMPLE I

Two-Stage Synthesis of Carboxyl Resin

First stage 36.6 parts of neopentilglycol 90% are placed in a flask under nitrogen and with stirring with 1.9 parts of Trimethylolpropane, 42.6 parts of terephthalic acid, 5.4 parts of isophtalic acid, 0.1 part of MBTO as catalyst and heated to 245° C. The reaction is continued at atmospheric pressure until a prepolymer containing hydroxyl groups is thus obtained which has the following characteristics: acid number mg KOH/g, ICI viscosity at 200° C. 605 mPa·s. Second stage 4.8 parts of adipic acid, 8.4 parts of isophthalic and 0.2 parts of trimethylolpropane are added at 220° C. to the prepolymer obtained in the first stage. The reaction is continued at 245° C. until the distillation under atmospheric pressure stops then the content of the flask is placed under vacuum (residual pressure 50 mmHg) until the polyester obtained has the following characteristics: Acid number 49.4 mg KOH/g, ICI viscosity at 200° C. 4020 mPa·s, Tg (DSC; 10° C./min) 58° C., Mw 13673 and Gardner Holdt color as a 50 wt. % solution in N-methyl-2-pyrrolidone of less than 1.

Accordingly the procedure as described in the example I, the polyesters of examples L, M, 1, 2, 3, 4 and 5 are prepared (compositions and properties are given in Tables 3 and 4). The examples I, L, M are compositions according the prior art and the examples 1 to 5 are compositions according to the invention.

TABLE 1

Resin composition of examples a, b, c, d, e, f, g and h according to the invention

|  | a | b | c | d | e | f | g | h |
|---|---|---|---|---|---|---|---|---|
| D-isosorbide | 27.0 | 37.2 | 37.2 | 28.6 | 18.7 | 18.7 | 18.7 | 26.3 |
| MEG | 0 | 0.0 | 0.0 | 5.9 | 9.6 | 9.6 | 9.6 | 0 |
| Trimethylolpropane | 0.0 | 0.0 | 0.0 | 0.7 | 0.8 | 0.8 | 0.8 | 4.7 |
| neopenthylglycol 90% | 11.4 | 0.0 | 0.0 | 0.0 | 0.0 | 0.0 | 0.0 | 10.6 |
| terephthalic acid | 7.3 | 0.0 | 0.0 | 40.5 | 38.6 | 38.6 | 38.6 | 7.1 |
| isophthalic acid | 30.9 | 0.0 | 0.0 | 0.0 | 0.0 | 0.0 | 0.0 | 29.4 |
| CHDA | 0.0 | 43.3 | 43.3 | 0.0 | 0.0 | 0.0 | 0.0 | 0 |
| Lauric Acid | 0.0 | 0.0 | 0.0 | 7.5 | 0.0 | 0.0 | 0.0 | 0 |
| Unsaturated dimer fatty acid | 0 | 19.1 | 19.1 | 13.2 | 0.0 | 0.0 | 0.0 | 0 |
| Satured dimer/trimer fatty acid | 19.9 | 0.0 | 0.0 | 0.0 | 0.0 | 0.0 | 27.6 | 19.2 |
| Unsatured dimer/trimer fatty acid | 0.0 | 0.0 | 0.0 | 0.0 | 0.0 | 27.6 | 0.0 | 0 |
| Satured dimer fatty acid | 0.0 | 0.0 | 0.0 | 0.0 | 27.6 | 0.0 | 0.0 | 0 |
| Adipic acid | 3.4 | 0.0 | 0.0 | 0.0 | 0.0 | 0.0 | 0.0 | 2.6 |
| TNH | 0.0 | 0.4 | 0.4 | 0.0 | 0.0 | 0.0 | 0.0 | 0 |
| MBTO | 0.1 | 0 | 0 | 0.1 | 0.1 | 0.1 | 0.1 | 0.1 |
| N.A. (mgKOH/g) * | 34.2 | 33.2 | 33.2 | 27.4 | 20.1 | 24.5 | 24.9 | 8.7 |
| NOH(mgKOH/g) ** | 12.5 | 9.5 | 9.5 | n.a | 4.5 | 3.5 | 5.4 | 61.4 |
| ICI Vix at 200° C. (mPa · s) | 3280 | 12000 | 12000 | 6000 | 4350 | 4380 | 4260 | 7300 |

\* acid value;

\*\* Hydroxyl value

TABLE 2

Properties of the examples a, b, c, d, e, f, g and h

| Appearance | clear | clear | clear | clear | clear | clear | clear | clear |
|---|---|---|---|---|---|---|---|---|
| Colour 50% DMF | 3 | 9 | 9 | 8 | 3 | 7/8 | 3 | 2/3 |
| Gel Time 180° C. * | 2'29" | n.a | n.a | 3'00" | 2'50" | 2'50" | 1'53" | 5'50" |
|  | Primid 95/5 |  |  | Epoxy 60/40 | Epoxy 60/40 | Epoxy 60/40 | Epoxy 60/40 | NCO |
| Tg (DSC) midpoint (° C.) | 53.4 | 51 | 51 | 56.5 | 45.9 | 51.5 | 51.6 | 44.3 |
| Mw | 11348 | 13108 | 13108 | 9316 | 17606 | 18196 | 17680 | 90421 |

\* gel time from blend resin/curative. Epoxy = solid Bisphenol A epoxy resin, NCO = blocked isocyanate

TABLE 3

Resin composition of comparative examples I, L, M, and examples 1-5 according to the invention.

|  |  | Comparatives | | | Invention | | | | |
|---|---|---|---|---|---|---|---|---|---|
|  | Polyester resin | I | L | M | 1 | 2 | 3 | 4 | 5 |
| 1st stage | CHDM | 0 | 0 | 0 | 0 | 0 | 6.1 | 0.0 | 0 |
|  | D-isosorbide | 0 | 0 | 0 | 5 | 5.7 | 0 | 0.0 | 0 |
|  | Trimethylolpropane | 1.9 | 1.9 | 1.1 | 0.9 | 0.8 | 0.9 | 0.5 | 0.5 |
|  | neopenthylglycol 90% | 36.6 | 36.7 | 38 | 30.3 | 30.7 | 29.5 | 36.9 | 37.4 |
|  | terephthalic acid | 42.6 | 36.7 | 34.6 | 34.9 | 35.7 | 38.4 | 37.6 | 38 |
|  | isophthalic acid | 5.4 | 11.1 | 19.5 | 11 | 9 | 8.1 | 7.9 | 8.0 |
|  | MBTO | 0.1 | 0.1 | 0.1 | 0.1 | 0.1 | 0.1 | 0.1 | 0.1 |
|  | N.A. (mgKOH/g) | 10 | 10 | 8.6 | 9.1 | 9.3 | 9.6 | 6.5 | 7.3 |
|  | ICI Vix at 200° C. (mPa · s) | 650 | 650 | 360 | 1260 | 730 | 880 | 1000 | 800 |

TABLE 3-continued

Resin composition of comparative examples I, L, M, and examples 1-5 according to the invention.

|  | Polyester resin | Comparatives | | | Invention | | | | |
|---|---|---|---|---|---|---|---|---|---|
|  |  | I | L | M | 1 | 2 | 3 | 4 | 5 |
| $2^{nd}$ stage | adipic acid | 4.8 | 4.8 | 6.7 | 2.1 | 0 | 0 | 0.0 | 0 |
|  | isophthalic acid | 8.4 | 8.4 | 0 | 7.2 | 9.6 | 12.3 | 12.0 | 12.3 |
|  | Satured dimer/trimer fatty acid | 0 | 0 | 0 | 8.5 | 8.4 | 4.4 | 4.3 | 0 |
|  | Lauric acid | 0 | 0 | 0 | 0 | 0 | 0 | 0 | 3 |
|  | Trimethylolpropane | 0.2 | 0.3 | 0 | 0 | 0 | 0.2 | 0.7 | 0.7 |

CHDM: cyclohexane dimethanol

CHDA: cyclohexane diacid

TABLE 4

Properties of the comparative examples I, L, M, examples 1-5 and examples a, b and c according to the invention

|  | PRIMID 93/7 Comparatives | | | PRIMID 93/7 Invention | | | | | PRIMID 95/5 Invention | | TGIC Inv. |
|---|---|---|---|---|---|---|---|---|---|---|---|
| Polyester resin | I | L | M | 1 | 2 | 3 | 4 | 5 | a | b | c |
| Appearance | clear | clear | clear | clear | clear | clear | clear | clear | clear | clear | clear |
| Colour 50% DMF | <1 | <1 | <1 | 4/5 | 4 | 4 | 2 | 2 | 3 | 9 | 9 |
| Acid value | 49.4 | 50.7 | 51.1 | 49.8 | 53.2 | 51.6 | 50.7 | 50.2 | 34.2 | 33.2 | 33.2 |
| Viscosity C&P 200° C. (mPa · s) | 4020 | 4000 | 1820 | 2430 | 2850 | 3330 | 2600 | 2360 | 3280 | 12000 | 12000 |
| Gel Time 180° C. * | 1' 34" | 1' 20" | 2' 26" | 1' 40" | 1' 29" | 2' 20" | 1' 55" | 2' 40" | 2'29" | n.a | n.a |
| Tg (DSC) midpoint (° C.) | 58 | 54 | 51.3 | 52.4 | 58.1 | 62 | 58.6 | 53.1 | 53.4 | 51 | 51 |
| Mw | 13673 | 14900 | n.d. | 11137 | 9914 | 10128 | 12294 | 10893 | 11348 | 13108 | 13108 |

* gel time from blend resin/curative

TABLE 5

Powder formulations

|  | Comparatives | | | Invention | | | | | | | |
|---|---|---|---|---|---|---|---|---|---|---|---|
| Polyester resin | I | L | M | 1 | 2 | 3 | 4 | 5 | a | b | c |
| Polyester resin weight | 302.2 | 302.2 | 302.2 | 302.2 | 302.2 | 302.2 | 302.2 | 302.2 | 308.7 | 451.2 | 398.0 |
| Primid XL 552 | 22.8 | 22.8 | 22.8 | 22.8 | 22.8 | 22.8 | 22.8 | 22.8 | 16.3 | 23.8 | 0.0 |
| TGIC |  |  |  |  |  |  |  |  |  |  | 33.0 |
| Masterbatch TEP |  |  |  |  |  |  |  |  |  | 0.0 | 44.0 |
| Resiflow PV 88 | 5.0 | 5.0 | 5.0 | 5.0 | 5.0 | 5.0 | 5.0 | 5.0 | 5.0 | 7.3 | 7.3 |
| Benzoin | 2.0 | 2.0 | 2.0 | 2.0 | 2.0 | 2.0 | 2.0 | 2.0 | 2.0 | 2.0 | 2.0 |
| Kronos 2160 | 168 | 168 | 168 | 168 | 168 | 168 | 168 | 168 | 168 | 1.7 | 1.7 |
| Hostaperm yellow H3G |  |  |  |  |  |  |  |  |  | 9.2 | 9.2 |
| Hostaperm Green GNX |  |  |  |  |  |  |  |  |  | 1.4 | 1.4 |
| Colortherm 10 |  |  |  |  |  |  |  |  |  | 3.4 | 3.4 |
| Total Weight | 500 | 500 | 500 | 500 | 500 | 500 | 500 | 500 | 500 | 500 | 500 |
| Polyester/Crosslinker | 93:7 | 93:7 | 93:7 | 93:7 | 93:7 | 93:7 | 93:7 | 93:7 | 95:5 | 95:5 | 93:7 |
| Pigment/Binder | 35:65 | 35:65 | 35:65 | 35:65 | 35:65 | 35:65 | 35:65 | 35:65 | 35:65 | 5:95 | 5:95 |
| Stability 24 h at 40° C. | good− | good− | bad | good−−− | good | good+ | good | good− | good− | good−− | good−− |

TABLE 6

Coating properties cured 10 min at 180° C.

| | Comparatives | | | Invention | | | | | | | |
|---|---|---|---|---|---|---|---|---|---|---|---|
| Polyester Resin | I | L | M | 1 | 2 | 3 | 4 | 5 | a | b | c |
| Thickness μ | 70/80 | 70/80 | 60/70 | 80/90 | 65/75 | 70/80 | 70/80 | 70/80 | 60/70 | 70/80 | 80/90 |
| Appearance | good | good | good | good | good | good | good | good | good | good | orange peel |
| Flow PCI | 5/6 | 5/6 | 5/6 | 7 | 6 | 6– | 6– | 6– | 6/7 | 7– | 1 |
| Gloss 60°/20° | 96/83 | 94/78 | 94/72 | 94/84 | 94/84 | 95/84 | 96/81 | 94/80 | 94/85 | 92/83 | 90/50 |
| MEK (0-5) 5 is the best | 5– | 4/5 | 5– | 5 | 4/5 | 5– | 5 | 4/5 | 4 | 3+ | 5– |
| Yellowing b value | 5.08 | 5.68 | 4.27 | 6.59 | 5.77 | 5.83 | 4.71 | 4.5 | 3.8 | n.a | n.a |
| Impact QD- 36 Dir. | 200 | 200 | 140 | 200 | 200 | 200 | 200 | 140 | 160 | 160 | 160 |
| Rev. | 200 | 160 | 140 | 200 | 200 | 200 | 200 | 140 | 160 | 160 | 160 |

TABLE 7

Coating properties cured 10 min at 160° C.

| | Comparatives | | | Invention | | | | | | | |
|---|---|---|---|---|---|---|---|---|---|---|---|
| Polyester Resin | I | L | M | 1 | 2 | 3 | 4 | 5 | a | b | c |
| Thickness μ | 70/80 | 70/80 | 70/80 | 80/90 | 70/80 | 70/80 | 70/80 | 70/80 | 65/75 | 75/85 | 80/90 |
| Appearance | good | good | good | good | good | good | good | good | good | good | orange peel |
| Flow PCI | 5/6 | 5/6 | 5/6 | 7 | 6 | 6– | 6– | 6– | 6/7 | 7 | 1 |
| Gloss 60°/20° | 94/81 | 96/84 | 95/78 | 95/86 | 95/86 | 96/87 | 97/83 | 95/85 | 93/86 | 92/84 | 79/30 |
| MEK (0-5) 5 is the best | (3)/4 | 3/4 | 4+ | 5 | 4– | 4– | (4)-5 | 4– | 3+ | 0 | 5– |
| Yellowing b value | 4.19 | 4.61 | 3.11 | 5.70 | 5.00 | 4.62 | 3.68 | 3.35 | 3.4 | n.a | n.a |
| Impact QD-36 Dir. | 20 | 20 | 160 | 200 | 120 | 200 | 100 | 40 | 10 | 0 | 160 |
| Rev. | 10 | 10 | 120 | 180 | 50 | 160 | 120 | 20 | 0 | 0 | 140 |

TABLE 8

Coating properties cured 30 min at 140° C.

| | PRIMID 93/7 Comparatives | | | PRIMID 93/7 Invention | | | | |
|---|---|---|---|---|---|---|---|---|
| Polyester resins | I | L | M | 1 | 2 | 3 | 4 | 5 |
| Thickness μ | 70/80 | 70/80 | 60/70 | 80/90 | 70/80 | 70/80 | 70/80 | 70/80 |
| Appearance | good | good | good | good | good | good | good | good |
| Flow PCI | 5/6 | 5/6 | 5/6 | 7 | 6 | 6– | 6– | 6– |
| Gloss 60°/20° | 80/70 | 90/80 | 93/78 | 95/88 | 95/85 | 95/86 | 94/85 | 94/80 |
| MEK (0-5) 5 is the best | 3/4 | 3/4 | 3+ | 4– | (3)/4 | 3/4 | (3)-4 | 3+ |
| Yellowing b value | 2.96 | 3.28 | 3.04 | 4.89 | 4.07 | 3.37 | 3.36 | 3.25 |
| Impact QD- 36 Dir. | 50 | 10 | 20 | 80 | 80 | 160 | 20 | 40 |
| Rev. | 30 | 10 | 0 | 80 | 80 | 200 | 10 | 20 |

Impact resistance evaluated according ASTM D 2794

These results clearly show that the thermosetting powder compositions in according with the invention have advantageous characteristics compared to those obtained from compositions of the prior art (Comparative examples I, L and M).

The invention claimed is:

1. A powder coating composition comprising a polyester resin comprising:
   (1) 0.1 to 60 weight percent of mono or poly-functional saturated or unsaturated fatty acids or mixtures thereof,
   (2) 30 to 60 weight percent of an aromatic diacid or cycloalkyl diacids or anhydrides selected from the group consisting of isophthalic acid, terephthalic acid, phthalic anhydride, trimellitic anhydride, furandicarboxylic acid, cyclohexandicarboxilic acid, hexahydrophtalic anhydride, and combinations thereof,
   (3) 20 to 30 weight percent of aliphatic diol,
   (4) 0 to 6 weight percent of aliphatic triol,
   (5) 5 to 10 weight percent of isosorbide and isomers of isosorbide,
   (6) 0 to 10 weight percent of $C_3$-$C_{12}$ aliphatic diacid, and
   with total weight percent of the monomers equal to 100, wherein an acid/alcohol mole ratio is higher than 1 and with an acid value of higher than 15 mg KOH/g and wherein the polyester resin has a melt viscosity at 200° C. from 1500 to 12000 mPa·s and a Tg of above 44° C. and lower than 70° C.

2. The powder coating composition of claim 1 wherein the polyester resin comprises:
   (1) 0.5 to 30 weight percent of mono or poly-functional saturated or unsaturated fatty acids of mixtures of them,
   (2) 30 to 60 weight percent of an aromatic diacid or cycloalkyl diacid or anhydride,
   (3) 20 to 30 weight percent of aliphatic diol,
   (4) 0 to 6 weight percent of aliphatic triol,
   (5) 5 to 10 weight percent of isosorbide and isomers of isosorbide, (6) 0 to 10 weight percent of $C_3$-$C_{12}$ aliphatic diacid, and with total weight percent of the monomers equal to 100.

3. The powder coating composition of claim 1 further comprising a curative selected from the group consisting of a non-isocyanurate polyepoxide, beta-hydroxyalkylamide, triglycidyl-isocyanurate, and epoxy resins in a weight percent from 2.5 to 50 based on total weight of polyester resin and curative.

4. The powder coating composition of claim 3 wherein the epoxy resins are selected from the group consisting of glycidyl ethers of bisphenol A, glycidyl ethers of bisphenol F, epoxy novolac resins, glycidyl esters, and mixtures thereof.

5. The powder coating composition of claim 1 wherein the cure temperature is lower than 180° C. and higher than 100° C.

6. A coated article comprising the polymeric composition of claim 5 in a cured film.

7. The powder coating composition of claim 1, wherein the polyester resin comprises:
(1) 8.5 weight percent of saturated dimer/trimer fatty acid;
(2) 34.9 weight percent of terephthalic acid;
(3) 18.2 weight percent of isophthalic acid;
(4) 30.3 weight percent of 90% neopentylglycol;
(5) 0.9 weight percent of trimethylolpropane;
(6) 2.1 weight percent adipic acid; and
(7) 5 weight percent of D-isosorbide.

8. The powder coating composition of claim 1, wherein the polyester resin comprises:
(1) 8.4 weight percent of saturated dimer/trimer fatty acid;
(2) 35.7 weight percent of terephthalic acid;
(3) 18.6 weight percent of isophthalic acid;
(4) 30.7 weight percent of 90% neopentylglycol;
(5) 0.8 weight percent of trimethylolpropane; and
(6) 5.7 weight percent of D-isosorbide.

* * * * *

UNITED STATES PATENT AND TRADEMARK OFFICE
CERTIFICATE OF CORRECTION

PATENT NO. : 9,475,956 B2
APPLICATION NO. : 13/967001
DATED : October 25, 2016
INVENTOR(S) : Damiano Beccaria et al.

It is certified that error appears in the above-identified patent and that said Letters Patent is hereby corrected as shown below:

On the Title Page

In Column 2 (page 1, item (56)) at Line 26, Under Other Publications, change "Astract" to --Abstract--.

Page 1 (item (57), Abstract) at Line 10, Change "satured" to --saturated--.

Page 1 (item (57), Abstract) at Line 10, Change "unsatured" to --unsaturated--.

Page 1 (item (57), Abstract) at Line 12, After "anhydride" insert --,--.

In the Specification

In Column 3 at Line 2, Change "that" to --than--.

In Column 3 at Line 7, Change "satured" to --saturated--.

In Column 3 at Line 7, Change "unsatured" to --unsaturated--.

In Column 3 at Line 19, Change "satured" to --saturated--.

In Column 3 at Line 19, Change "unsatured" to --unsaturated--.

In Column 3 at Line 32, Change "cyclohexandicarboxilic" to --cyclohexanedicarboxylic--.

In Column 3 at Line 33, Change "hexahydrophtalic" to --hexahydrophthalic--.

In Column 6 at Lines 41-42, Change "neopentilglycol" to --neopentylglycol--.

Signed and Sealed this
Twenty-eighth Day of March, 2017

Michelle K. Lee
*Director of the United States Patent and Trademark Office*

CERTIFICATE OF CORRECTION (continued)
U.S. Pat. No. 9,475,956 B2

In Column 6 at Line 43, Change "isophtalic" to --isophthalic--.

In Column 6 at Line 43, Change "satured" to --saturated--.

In Column 6 at Line 63, Change "neopentilglycol" to --neopentylglycol--.

In Column 6 at Line 66, Change "isophtalic" to --isophthalic--.

In Column 8 at Line 11 (approx., Table 1), Change "unsatured" to --unsaturated--.

In Column 8 at Line 13 (approx., Table 1), Change "satured" to --saturated--.

In Column 8 at Line 15 (approx., Table 1), Change "unsatured" to --unsaturated--.

In Column 8 at Line 17 (approx., Table 1), Change "satured" to --saturated--.

In Column 9 at Line 7 (approx., Table 3), Change "satured" to --saturated--.

In the Claims

In Column 11 at Line 64, In Claim 1, change "cyclohexandicarboxilic" to --cyclohexanedicarboxylic--.

In Column 11 at Lines 64-65, In Claim 1, change "hexahydrophtalic" to --hexahydrophthalic--.